UNITED STATES PATENT OFFICE.

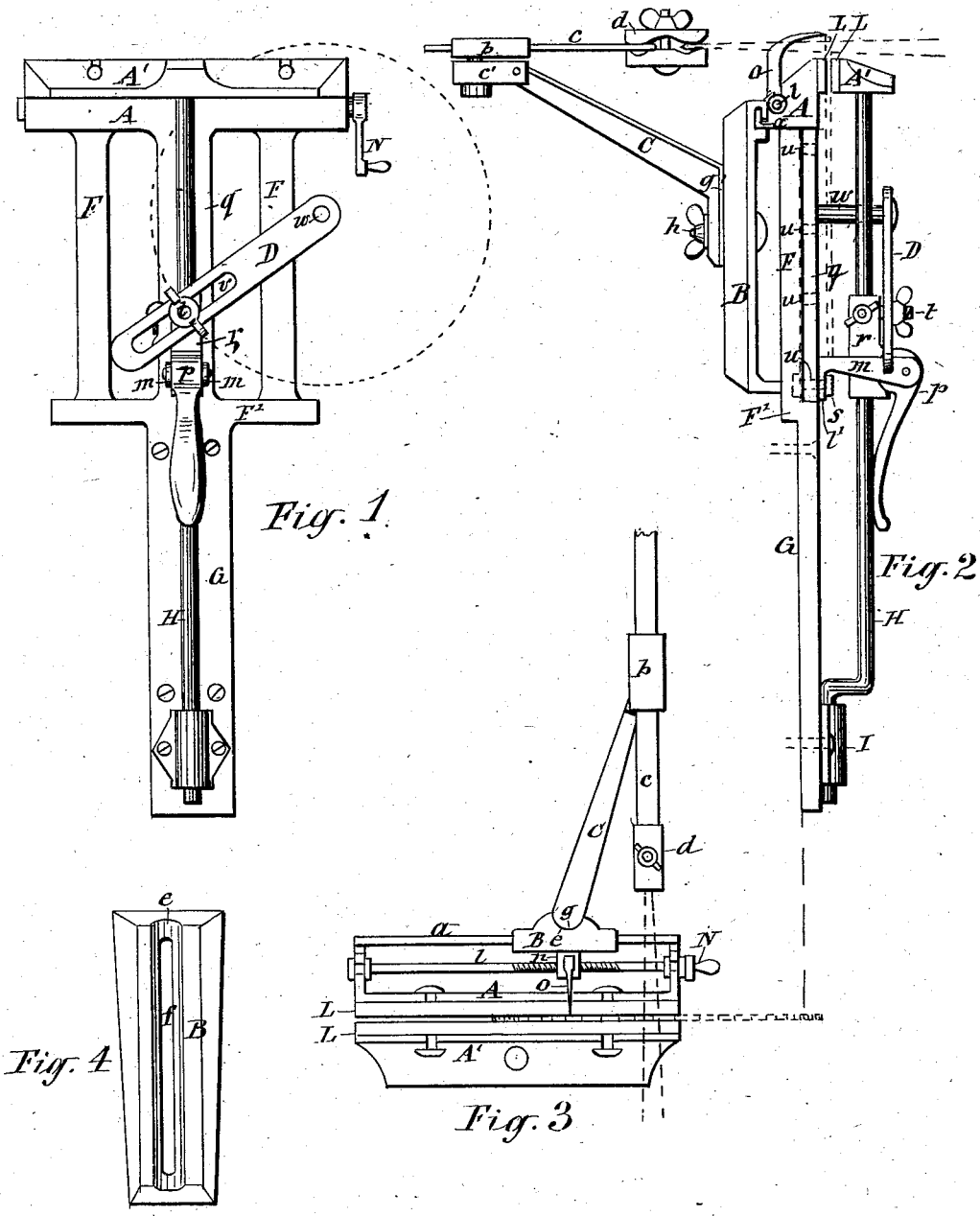

ALBA W. BROUGHTON, OF JORDAN, NEW YORK.

SAW SHARPENING AND CLAMPING DEVICE.

SPECIFICATION forming part of Letters Patent No. 259,805, dated June 20, 1882.

Application filed March 9, 1882. (No model.)

*To all whom it may concern:*

Be it known that I, ALBA W. BROUGHTON, of Jordan, in the county of Onondaga, in the State of New York, have invented new and useful Improvements in Saw-Filing Apparatus, of which the following, taken in connection with the accompanying drawings, is a full, clear, and exact description.

This invention consists in the combination, with a saw-filing clamp or vise, of certain novel devices for guiding the file in the operation of filing a saw, and thus greatly facilitating said operation and rendering the same more effective and more accurate.

The invention also consists in the combination, with the aforesaid saw-filing clamp, of an arm adjustably connected to the shank or supporting-arm of one of the clamp-jaws and provided on the free end with a spindle or arbor to receive the eye of a circular saw and support said saw during the process of filing the same, all as hereinafter fully explained, and specifically set forth in the claims.

The invention is fully illustrated in the annexed drawings, wherein Figure 1 is a front view of my improved saw-filing apparatus; Fig. 2, a side view of the same; Fig. 3, a top view; and Fig. 4 is a rear view of the shank which, in conjunction with an arm projecting therefrom, supports the file-guiding device.

Similar letters of reference indicate corresponding parts.

A represents the stationary jaw of the vise or clamp, said jaw being supported by a suitable upright frame, F, adapted to be secured to a work-bench, and having a central post, g, extended from the jaw to the base F', by which it is seated upon the edge of the work-bench. A pendent shank, G, rigidly attached or integral with the base F', rests against and is secured to the front of the work-bench, and effectually sustains the jaw A in its upright position.

A' is the movable jaw of the vise or clamp, said jaw being mounted on a rod, H, which has its lower end resting in a socket, I, secured to the shank G, the faces of the two jaws being lined with wood, as shown at L L in Figs. 2 and 3 of the drawings. The stationary jaw A has back of and parallel with its face an upward-projecting rib or flange, a, upon which slides a pendent shank, B, which has its foot resting against the base F' of the jaw supporting frame, said shank being allowed to slide bodily the length of the jaw and being guided by the flange a. The back of the shank B is formed with a rounded vertical recess, e, extending the length thereof, and in the center of said recess there is a vertical slot, f, extended through the shank.

C is an arm adjustably connected to and rearwardly and upwardly projecting from the shank B, said arm having a shoulder, g', which is rounded to fit into the recess e of the shank B, so as to allow it to swing radially thereon. By means of a bolt, h, passing through the slot f of the said shank and through an eye in the shoulder g' of the arm C, said arm can be clamped at any desired angle and height on the shank B. On the free end of the arm C is hinged a vertically-vibrating extension, c', and on top of this extension is pivoted a sleeve or guide, b, in which slides longitudinally a bar or rod, c. To that end of the rod c which points toward the vise is connected a suitable clamp, d, adapted to hold the tip end of the file, as indicated by dotted lines in Figs. 2 and 3 of the drawings.

To the upper end of the shank B is connected a nut, n, in which works a screw-rod, l, which is extended the length of the jaw A, and is shouldered against the ends thereof, so as to prevent said rod from moving longitudinally, a crank, N, being applied to the end of the rod l for turning the same, and thereby causing the shank B to slide on its guide a.

o designates a pointer which projects from the nut n, and is extended over the top of the jaw A, for the purpose hereinafter explained.

On the supporting-rod H of the jaw A' is a block, r, adapted to slide lengthwise the said rod, and provided with a set-screw, by means of which it may be secured at any desired elevation. The front of the block r is provided with a concave face, in which rests the circular head of a lever, p, which head is pivoted eccentrically on a clamp, m, consisting of a horizontal arm, which is extended to the post g of the jaw A, and has pendent lugs l', by which it rests against said post g. A bolt, s, passing between the lugs l' and through the post g, secures the clamp m in position. By depressing the lever p on the free end of the clamp m the eccentric head of said lever crowds the rod H with the jaw A' toward the fixed jaw A, and causes the two jaws to grip the saw-blade to be filed.

In order to adapt the apparatus for filing circular as well as all kinds of elongated saws, I provide the post $g$ with a series of holes, $u\ u$, for the bolt $s$ of the clamp $m$, so as to allow said clamp to be secured at various distances from the top of the jaws A A', and the outer face of the block $r$, I provide with a rigid screw-threaded stud-pin, $t$, which passes through a slot, $v$, in an arm, D, and has on its extremity a nut, by means of which said arm can be clamped in its desired position on the block $r$. The free end of the arm D is provided with a rearwardly-projecting arbor, $w$, which passes through the eye of the circular saw to be filed, as indicated by dotted lines in the drawings.

The operation of my invention is as follows: If a handsaw or other elongated saw-blade is to be sharpened, said blade is introduced between the two jaws A A', and clamped therein by depressing the lever $p$. Then the shank B is moved to one end of the jaw A and the arm C raised or lowered and secured at such an angle radially from the shank B as to allow the file clamped on the reciprocating rod $c$ to be drawn at the proper angle across the saw-tooth to be filed. After the filing of each tooth the screw-rod $l$ is to be turned until the pointer $o$ has moved the distance from tooth to tooth, which indicates that the shank B has been carried a corresponding distance along the guide $a$, and thus allows the file to be applied to the succeeding tooth at the requisite angle.

In filing a circular saw the blade is mounted on the arbor $w$ of the arm D, and the latter is adjusted to support said blade with a portion of its teeth projecting a proper length above the vise in which it is clamped, as shown by dotted lines in Figs. 1, 2, and 3 of the drawings. Then the arm C is set on the shank B to carry the file at a proper angle across the tooth of the circular saw, and the saw is turned on the arbor $w$ the distance from tooth to tooth after the filing of each tooth.

In filing handsaws and other elongated saw-blades the clamp $m$ is to be connected to the upper holes $u$ of the post $g$; but in filing circular saws said clamp has to be secured to one of the lower holes $u$ and set to clear the edge of the saw, as best seen in Fig. 1 of the drawings.

Having described my invention, what I claim is—

1. The combination, with a saw-filing clamp or vise, of an arm extended from the stationary jaw and adapted to slide bodily in a line parallel with the face of said jaw, a sleeve or guide connected to the free end of said arm, a rod or bar sliding longitudinally in said guide, and a file-clamp connected to said rod, all combined as set forth.

2. The combination of the jaw A, provided with the guide $a$, the shank B, movably connected with said guide, the arm C, extended radially from and adjustable upon the shank B, the hinged extension $c'$, pivoted guide $b$, reciprocating rod $c$, and the file-clamp $d$, as shown and described.

3. The combination of the jaw A, provided with the guide $a$, the sliding shank B, provided with the vertical recess $e$ and slot $f$, the arm C, having the rounded shoulder $g'$, resting in the recess $e$, the clamp-bolt $h$, the hinged arm-extension $c'$, pivoted guide $b$, reciprocating rod $c$, and the file-clamp $d$, all substantially as shown and set forth.

4. The combination, with the jaw A and the shank B, supporting the arm C, and file-guiding device connected therewith, of the nut $n$, connected to the shank B, and the screw-rod $l$, shouldered on the jaw A, as described and shown.

5. The combination, with the jaw A and the shank B, supporting the arm C, and file-guiding devices connected therewith, of the nut $n$, pointer $o$, and adjusting-screw $l$, combined and operating as described, for the purpose set forth.

6. The combination, with the jaws A A', of the post $g$, provided with holes $u$, the sliding block $r$, clamp $m$, cam-lever $p$, and bolt $s$, as described and shown.

7. The combination, with the jaws A A', of the clamp $m$, adapted to be set at various heights on the supporting-arms of said jaws, the block $r$, provided with the stud-pin $t$, and the arm D, provided with the slot $v$ and with the arbor $w$, all as described and shown, for the purpose set forth.

In testimony whereof I have hereunto signed my name and affixed my seal in the presence of two attesting witnesses, at Syracuse, in the county of Onondaga, in the State of New York, this 27th day of February, 1882.

ALBA W. BROUGHTON. [L. S.]

Witnesses:
WM. C. RAYMOND,
C. H. DUELL.